US009168948B2

(12) United States Patent
Yamamoto

(10) Patent No.: US 9,168,948 B2
(45) Date of Patent: Oct. 27, 2015

(54) STEERING SYSTEM

(71) Applicant: JTEKT CORPORATION, Osaka-shi, Osaka (JP)

(72) Inventor: Yasuharu Yamamoto, Toyota (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/291,646

(22) Filed: May 30, 2014

(65) Prior Publication Data

US 2014/0353068 A1 Dec. 4, 2014

(30) Foreign Application Priority Data

Jun. 4, 2013 (JP) .................................. 2013-117870
Jun. 7, 2013 (JP) .................................. 2013-120962

(51) Int. Cl.
*B62D 5/04* (2006.01)
(52) U.S. Cl.
CPC ............ *B62D 5/0412* (2013.01); *B62D 5/0424* (2013.01); *B62D 5/0448* (2013.01)
(58) Field of Classification Search
CPC ...... B62D 5/04; B62D 5/0424; B62D 5/0445; B62D 5/0448
USPC ................ 180/443, 444; 74/388 PS, 424.71, 74/424.81, 424.87; 411/127, 161, 177, 411/178, 922, 946, 395, 999
See application file for complete search history.

(56) References Cited

U.S. PATENT DOCUMENTS

| 863,183 | A * | 8/1907 | Jackson et al. ................ 411/176 |
| 1,289,867 | A * | 12/1918 | Moore .......................... 411/329 |
| 2004/0221668 | A1* | 11/2004 | Saruwatari et al. ....... 74/388 PS |
| 2007/0144823 | A1* | 6/2007 | Senda et al. .................. 180/444 |
| 2007/0151378 | A1* | 7/2007 | Bareis et al. .............. 74/388 PS |
| 2009/0294203 | A1* | 12/2009 | Okada et al. .................. 180/444 |
| 2012/0018242 | A1* | 1/2012 | Yamamoto .................... 180/444 |
| 2012/0205184 | A1* | 8/2012 | Knoedler et al. ............. 180/444 |
| 2013/0206498 | A1* | 8/2013 | Froehlich ...................... 180/444 |
| 2014/0027196 | A1 | 1/2014 | KANEKO et al. |

FOREIGN PATENT DOCUMENTS

| DE | 10 2009 046 386 A1 | 5/2011 |
| DE | 10 2010 027 794 A1 | 10/2011 |
| DE | 10 2010 042 817 A1 | 4/2012 |
| EP | 1 977 951 A2 | 10/2008 |

(Continued)

OTHER PUBLICATIONS

U.S. Appl. No. 14/291,738, filed May 30, 2014.

(Continued)

*Primary Examiner* — Anne Marie Boehler
(74) *Attorney, Agent, or Firm* — Oliff PLC

(57) ABSTRACT

In an electric power steering system, rotation of a motor is transmitted to a rack shaft via a drive pulley, a belt, a driven pulley and a ball nut. A ball bearing and the driven pulley are fitted to the outer periphery of the ball nut. A flange is formed at a first end portion of the ball nut, and an internal thread portion is formed at a second end portion of the ball nut. An external thread member is connected to the internal thread portion. The external thread member has an external thread portion and a flange. By fastening the external thread portion to the internal thread portion, the ball bearing and the driven pulley are held between the two flanges.

4 Claims, 6 Drawing Sheets

(56) References Cited

FOREIGN PATENT DOCUMENTS

| | | |
|---|---|---|
| EP | 2 476 602 A2 | 7/2012 |
| JP | A-2011-088462 | 5/2011 |

OTHER PUBLICATIONS

Extended European Search Report issued in European Patent Application No. 14170758.8 dated Oct. 9, 2014.

* cited by examiner

STEERING SYSTEM

INCORPORATION BY REFERENCE

The disclosure of Japanese Patent Applications No. 2013-117870 and No. 2013-120962 filed respectively on Jun. 4, 2013 and Jun. 7, 2013, each including the specification, drawings and abstract is incorporated herein by reference in its entirety.

BACKGROUND OF THE INVENTION

1. Field of the Invention

The invention relates to a steering system.

2. Description of Related Art

There is a conventional electric power steering system (hereinafter, referred to as "EPS") that assists a driver's steering operation by applying torque generated by a motor to a steering mechanism of a vehicle. For example, an EPS described in Japanese Patent Application Publication No. 2011-88462 (JP 2011-88462 A) includes a rack-and-pinion mechanism that serves as a steering mechanism. The rack-and-pinion mechanism changes the orientation of wheels by converting the rotation of a pinion caused by a steering operation into a liner motion of a rack shaft (steered shaft) meshed with the pinion. The rack shaft is provided with a ball screw mechanism that converts the rotation output from a motor into a linear motion of the rack shaft. That is, the torque generated by the motor is converted into an axial force of the rack shaft in its axial direction, so that the steering operation is assisted.

Specifically, as illustrated in FIG. 9, in an EPS 100, the torque generated by a motor 101 is transmitted to a rack shaft 106 via a drive pulley 102, a timing belt 103, a driven pulley 104 and a ball screw mechanism 105. The opposite ends of the rack shaft 106 are connected to wheels via tie rods (not illustrated).

The ball screw mechanism 105 includes a ball nut 107 screwed into a spiral groove 106a in the rack shaft 106 via multiple balls. A first end portion of a cylindrical nut holder 108 that covers the outer periphery of the rack shaft 106 is fitted to the outer peripheral face of the ball nut 107, and the driven pulley 104 is fitted to the outer peripheral face of a second end portion of the nut holder 108.

The ball nut 107 is held between a step portion 108a formed in the inner peripheral face of the nut holder 108 and a cylindrical external thread 109 screwed to an opening portion of the nut holder 108, which is located on the opposite side of the nut holder 108 from the driven pulley 104. Thus, an axial displacement of the ball nut 107 and rotation of the ball nut 107 relative to the nut holder 108 are restricted. A bolt 110 is screwed into the nut holder 108. The distal end of the bolt 110 is passed though the nut holder 108 in the radial direction of the nut holder 108, and is fastened to the outer periphery of the ball nut 107. Thus, even if the external thread 109 is loosened, the rotation of the ball nut 107 relative to the nut holder 108 is restricted.

Three bearings 111, 112, 113 are interposed between the outer peripheral face of the nut holder 108 and the inner peripheral face of a casing 115. The nut holder 108, the ball nut 107 and the external thread 109 rotate together with each other in accordance with the rotation of the driven pulley 104.

In recent years, energy saving effect of EPSs including the EPS described in JP 2011-88402 draw widespread attention, and therefore the number of types of vehicles in which EPSs are mounted has been increasing. On the other hand, there has been a growing demand for more compact EPSs from the viewpoint of enhancing the ease of mounting the EPSs in vehicles. However, in the EPS 100 described in JP 2011-88462 A, the driven pulley 104, the two bearings 111, 112, the bolt 110, the ball nut 107 and the external thread 109 are arranged on the nut holder 108 along the axial direction of the rack shaft 106. Thus, there are limitations to reduction of the length of the EPS 10 in the axial direction of the rack shaft 106.

SUMMARY OF THE INVENTION

One object of the invention is to provide a steering system that is more compact in the axial direction of a steered shaft.

A steering system according to an aspect of the invention includes: a steered shaft that makes a linear motion in a housing to steer steered wheels; a driving wheel that is disposed in the housing, and that rotates about an axis extending parallel to an axis of the steered shaft in response to driving of a motor; a ball nut screwed to the steered shaft via multiple balls, and supported via a bearing by an inner peripheral face of the housing so as to be rotatable relative to the inner peripheral face of the housing, the ball nut having a first end portion and a second end portion, a first flange being formed on an outer peripheral face of the first end portion and an inner-diameter-increased portion being formed in an inner peripheral face of the second end portion; a driven wheel fitted on an outer periphery of the ball nut to transmit rotation of the driving wheel to the ball nut; and a hollow connection member including a connection portion inserted in and connected to the inner-diameter-increased portion, and a second flange. The bearing and the driven wheel are held between the second flange and the first flange in an axial direction of the steered shaft when the connection portion is connected to the inner-diameter-increased portion.

According to the aspect of the invention, the bearing and the driven wheel are secured to the outer peripheral face of the ball nut by the first flange and the second flange. The bearing, the driven wheel and the connection portion of the connection member are overlapped with the ball nut in the axial direction of the steered shaft. Thus, it is possible to reduce the length of the steering system in the axial direction of the steered shaft.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a so-called rack parallel-type electric power steering system according to an embodiment of the invention will be described with reference to the accompanying drawings. A rack parallel-type electric power steering system is an electric power steering system in which a steering assist motor is disposed such that the axis of the steering assist motor is parallel to a rack shaft.

Figure 1:
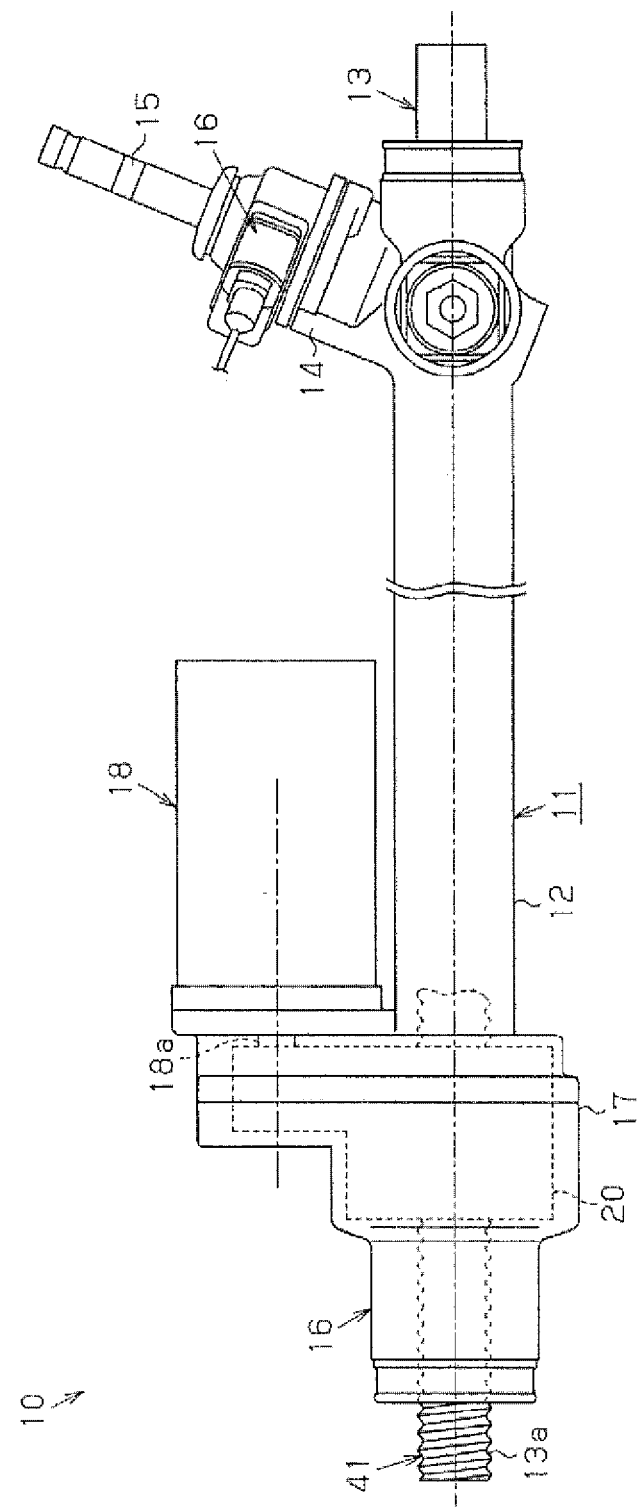
FIG. 1 is a front view of an electric power steering system according to an embodiment of the invention.

As illustrated in FIG. 1, an electric power steering system 10 includes a housing 11 secured to a vehicle body (not illustrated). The housing 11 is disposed such that a body 12 having a tubular shape extends in the lateral direction of the vehicle body (the lateral direction in FIG. 1). A rack shaft 13 is passed through the body 12. Wheels (not illustrated) are respectively coupled to the opposite ends of the rack shaft 13 via ball joints (not illustrated). As the rack shaft 13 moves in its axial direction, the orientation of the wheels is changed.

The body 12 has a first accommodation portion 14 formed at a position near the right end of the body 12. The first accommodation portion 14 extends in a direction that obliquely intersects with the axial direction of the body 12 (the lateral direction in FIG. 1). A pinion shaft 15 is inserted in and rotatably supported by the first accommodation portion 14. Pinion teeth formed on an inner end portion of the pinion shaft 15 are meshed with rack teeth formed on a portion of the rack shaft 13 within a prescribed range located near the right end of the rack shaft 13. An outer end portion of the pinion shaft 15, which is located on the opposite side of the pinion shaft 15 from the pinion teeth, is connected to a steering wheel via a plurality of shafts (not illustrated). Thus, in response to a steering operation, the rack shaft 13 makes a linear motion in its axial direction. The torque that acts on the pinion shaft 15 in response to the steering operation is detected by a torque sensor 16 provided on the first accommodation portion 14.

The body 12 has a second accommodation portion 17 formed at a position near the left end of the body 12. The second accommodation portion 17 has a cylindrical portion having a diameter larger than that of the body 12 and having an upper portion that extends upward. A motor 18 is secured to an upper right side wall of the second accommodation portion 17. The motor 18 has an output shaft 18*a* that extends along an axis that is parallel to the axis of the rack shaft 13, and that is inserted into the second accommodation portion 17 through a side wall of the second accommodation portion 17. A power conversion mechanism 20 is disposed in the second accommodation portion 17. The output shaft 18*a* of the motor 18 is coupled to the power conversion mechanism 20. The power conversion mechanism 20 converts the rotary motion generated by the motor 18 into a linear motion of the rack shaft 13. That is, the motion of the rack shaft 13 is assisted with the use of the torque generated by the motor 18, so that the driver's steering operation is assisted. The motor 18 is controlled by a controller (not illustrated) based on, for example, a value detected by the torque sensor 16.

Figure 2:
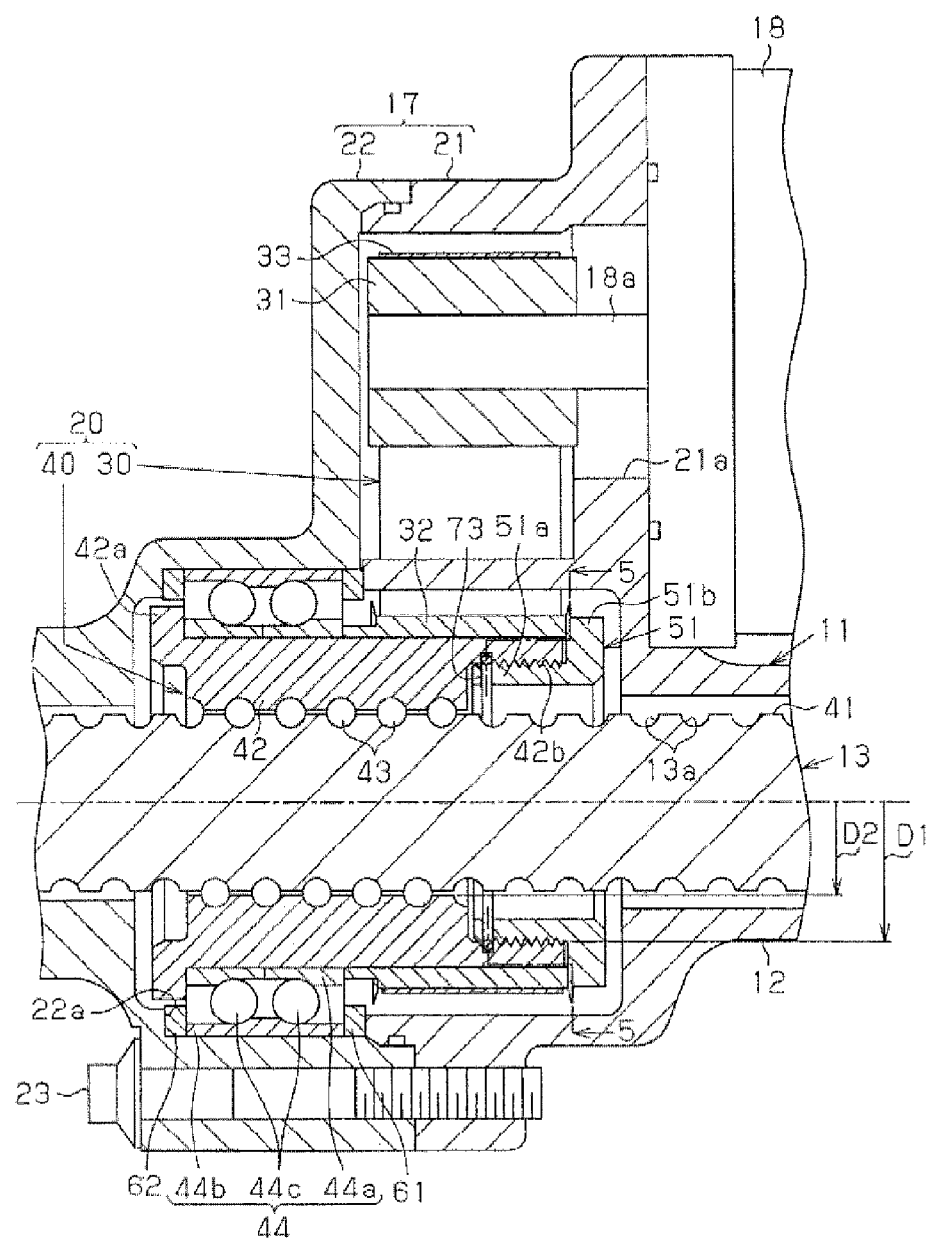
FIG. 2 is an enlarged sectional view illustrating main portions of the electric power steering system according to the embodiment.

The configuration of the second accommodation portion 17 will be described in detail below. As illustrated in FIG. 2, the second accommodation portion 17 has a cylindrical support portion 21 and a stepped cylindrical cover member 22. The support portion 21 is integrally formed with the left end of the body 12. The support portion 21 has an upper portion that extends upward from the body 12, and a hole 21*a* is formed in a right side wall of the thus extended upper portion. The output shaft 18*a* of the motor 18 is inserted into the hole 21*a* from the right side of the hole 21*a*. A left opening of the support portion 21 is closed by the cover member 22. The cover member 22 is secured to the support portion 21 with bolts 23. The power conversion mechanism 20 is disposed in a space defined between the support portion 21 and the cover member 22.

As illustrated in FIG. 2, the power conversion mechanism 20 includes a belt transmission mechanism 30 and a ball screw mechanism 40. The belt transmission mechanism 30 transmits the rotary motion generated by the motor 18 to the ball screw mechanism 40. The ball screw mechanism 40 coverts the rotary motion generated by the motor 18 and transmitted by the belt transmission mechanism 30 into a linear motion of the rack shaft 13.

The ball screw mechanism 40 includes a ball screw portion 41 formed in the rack shaft 13, a cylindrical ball nut 42 and multiple balls 43.

The ball screw portion 41 is a portion of the outer peripheral face of the rack shaft 13, in which a ball screw groove 13*a* is formed. The ball screw portion 41 is formed in a prescribed range extending toward the right end of the rack shaft 13 from the left end thereof.

The ball nut 42 is screwed to the ball screw portion 41 via the multiple balls 43 so as to be movable back and forth. A flange 42*a* is formed on the outer peripheral face of a first end portion (the left end in FIG. 2) of the ball nut 42, and an internal thread portion 42*b* is formed on the inner peripheral face of a second end portion (the right end in FIG. 2) of the ball nut 42. The internal thread portion 42*b* is formed in a prescribed range extending in the axial direction of the ball nut 42 from the right end of the ball nut 42. An inner diameter D1 of the internal thread portion 42*b* is set larger than an inner diameter D2 of the other portion of the ball nut 42 than the internal thread portion 42*b*. In response to the rotation of the ball nut 42, the multiple balls 43 roll between the ball nut 42 and the ball screw portion 41.

A double row ball bearing 44 is secured to the outer peripheral face of the ball nut 42. The ball nut 42 is supported via the ball bearing 44 by the housing 11 so as to be rotatable relative to the housing 1, more specifically, supported via the bearing 44 by the inner peripheral face of the cover member 22 so as to be rotatable relative to the inner peripheral face of the cover member 22. The ball bearing 44 includes an inner ring 44*a*, an outer ring 44*b* and a plurality of balls 44*c*. The inner ring 44*a* is fitted to the outer peripheral face of the ball nut 42. The outer ring 44*b* is fitted to the inner peripheral face of the cover member 22. In response to the rotation of the ball nut 42, the balls 44*c* roll between the inner ring 44*a* and the outer ring 44*b*.

The belt transmission mechanism 30 includes a cylindrical drive pulley 31, a cylindrical driven pulley 32 and an endless belt 33.

The drive pulley 31 is secured to the output shaft 18*a* of the motor 18. The driven pulley 32 is secured to the outer peripheral face of the ball nut 42. The driven pulley 32 and the ball bearing 44 are arranged adjacent to each other. The ball bearing 44 and the driven pulley 32 are arranged in this order from the flange 42*a*-side of the ball nut 42. The belt 33 is looped over the drive pulley 31 and the driven pulley 32. Thus, the rotary motion generated by the motor 18 is transmitted to the ball nut 42 via the drive pulley 31, the belt 33 and the driven pulley 32. The drive pulley 31 and the driven pulley 32 are toothed pulleys (timing pulleys) each having teeth formed on its outer peripheral face. The belt 33 is a toothed belt (timing belt) having teeth formed on its inner peripheral face.

A configuration for securing the ball bearing 44 and the driven pulley 32 will be described below. As illustrated in FIG. 2, the ball bearing 44 and the driven pulley 32 are secured to the ball nut 42 by fastening an external thread member 51 into the internal thread portion 42b of the ball nut 42.

The external thread member 51 has a cylindrical hollow an external thread portion 51a and an annular flange 51b formed on the outer periphery of an end portion of the external thread member 51, the end portion being located adjacent to the external thread portion 51a. The flange 51b has an outer diameter that is set larger an outer diameter of the ball nut 42. Thus, the flange 51b is allowed to abut against one side face of the driven pulley 32 in the axial direction of the ball nut 42.

The inner ring 44a of the ball bearing 44 and the driven pulley 32 are held between the flange 42a of the ball nut 42 and the flange 51b of the external thread member 51 in the axial direction of the ball nut 42. By fastening the external thread portion 51a of the external thread member 51 to the internal thread portion 42b of the ball nut 42, the inner ring 44a is pressed against a right side face of the flange 42a of the ball nut 42 via the driven pulley 32 by the flange 51b of the external thread member 51. Because the inner ring 44a and the driven pulley 32 are held between the two flanges 42a, 51b, the position of the ball bearing 44 (the inner ring 44a) in the axial direction with respect to the ball nut 42 is fixed.

An annular support member 61 is interposed between the outer ring 44b and an opening end face of the support portion 21, and an annular support member 62 is interposed between the outer ring 44b and an annular step portion 22a formed in the inner bottom face of the cover member 22. Because the outer ring 44b is held between the support portion 21 and the cover member 22 via the support member 61 and the support member 62, the axial position of the ball bearing 44 (outer ring 44b) with respect to the cover member 22 is fixed.

In the present embodiment, in order to restrain the external thread member 51 from coming off the ball nut 42, the following configuration is adopted.

Figure 3:
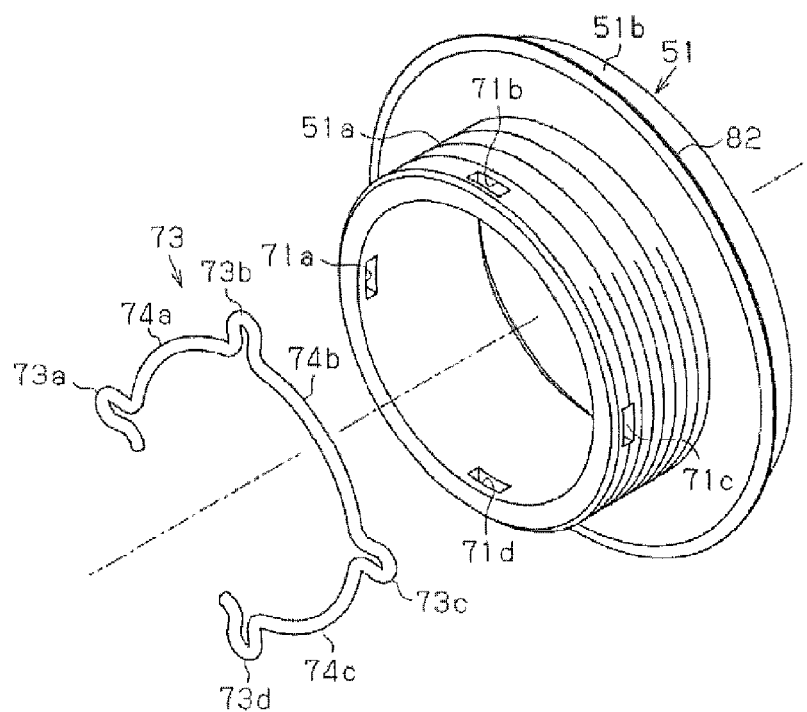
FIG. 3 is an exploded perspective view illustrating an external thread member and a restricting member in the embodiment.

As illustrated in FIG. 3, four rectangular holes 71a to 71d are formed in the external thread portion 51a, at positions near the distal end of the external thread portion 51a. The holes 71a to 71d are arranged at angular intervals of 90° around the axis of the external thread member 51.

Figure 4:
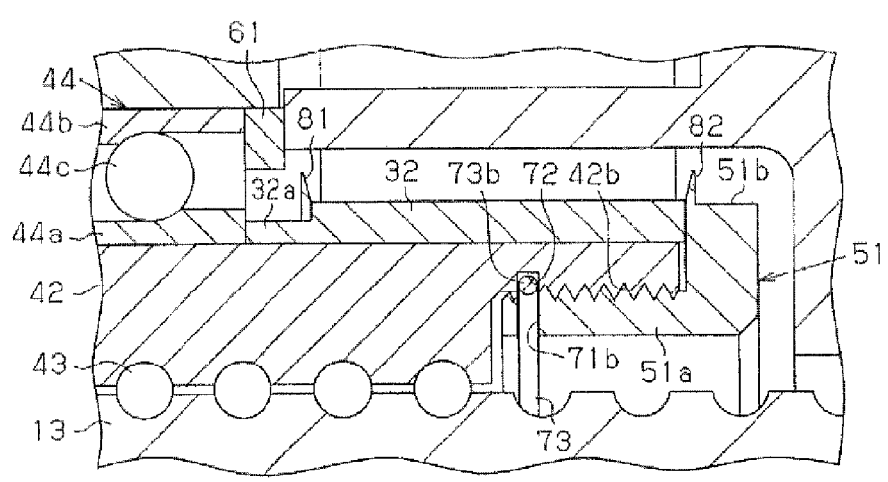
FIG. 4 is an enlarged sectional view illustrating the configuration near a driven pulley and the external thread member of the electric power steering system in the embodiment.

As illustrated in FIG. 4, an annular groove 72 is formed in the internal thread portion 42b of the ball nut 42, at a position near the inner bottom face of the ball nut 42. When the external thread portion 51a is screwed into the internal thread portion 42b up to such a position that the ball bearing 44 and the driven pulley 32 are held between the two flanges 42a, 51b, the position of the groove 72 and the positions of the holes 71a to 71d coincide with each other in the axial direction of the ball nut 42. In the state where these positions coincide with each other, a restricting member 73 is set inside the external thread portion 51a.

As illustrated in FIG. 3, the restricting member 73 is formed by bending a single metal wire so as to have a C-shape as a whole. The restricting member 73 has four protrusions 73a to 73d and three connection portions 74a to 74c. The protrusions 73a to 73d each have a U-shape that is open toward the axis of the restricting member 73, which coincides with the axis of the external thread member 51. The connection portions 74a to 74c are each curved in a circular arc-shape so as to conform to the inner peripheral face of the external thread portion 51a.

A first end of the protrusion 73a is a free end. A second end of the protrusion 73a and a first end of the protrusion 73b are connected to each other by the connection portion 74a. A second end of the protrusion 73b and a first end of the protrusion 73c are connected to each other by the connection portion 74b. A second end of the protrusion 73c and a first end of the protrusion 73d are connected to each other by the connection portion 74c. A second end of the protrusion 73d is a free end.

In order to set the restricting member 73 inside the external thread member 51, the restricting member 73 is inserted into the external thread member 51 from an opening located on the opposite side of the external thread member 51 from the flange 51b while the restricting member 73 is elastically deformed such that the diameter of the restricting member 73 is reduced, and then the protrusions 73a to 73d are inserted respectively into the holes 71a to 71d from the inside of the external thread portion 51a.

Figure 5:
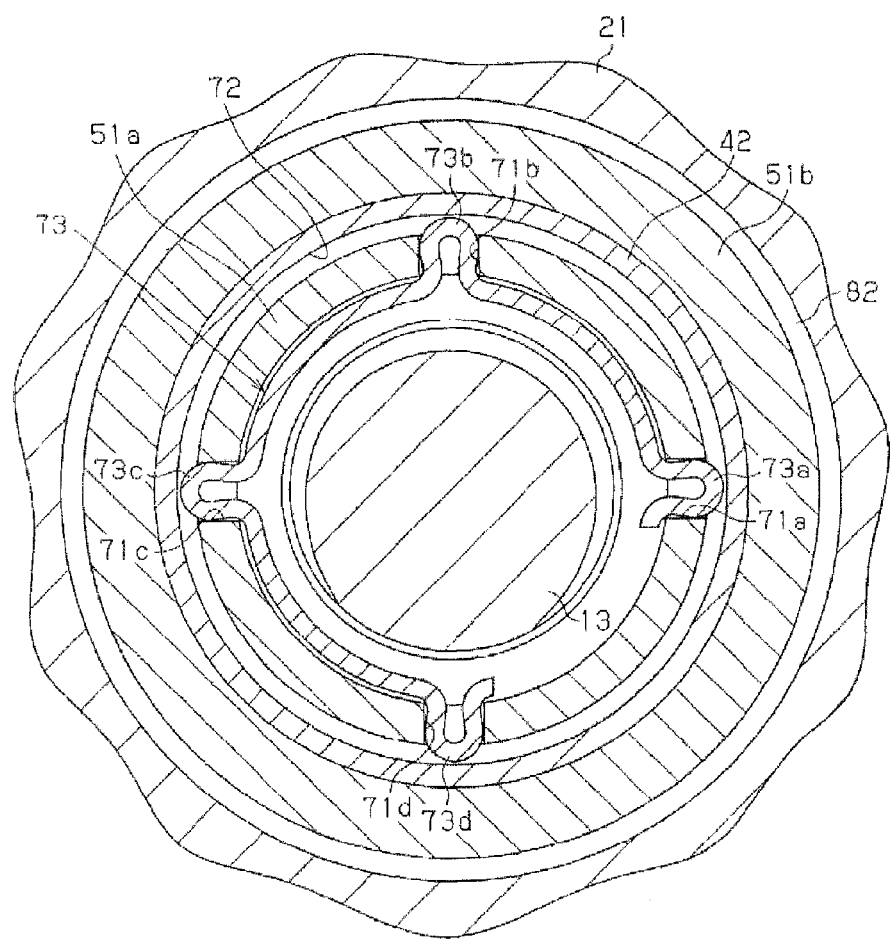
FIG. 5 is a sectional view taken along the line 5-5 in FIG. 2.

As illustrated in FIG. 5, after the restricting member 73 is fitted inside the external thread member 51, tip ends of the protrusions 73a to 73d are slightly protruded from the outer peripheral face (more specifically, tooth tips) of the external thread portion 51a and are inserted in the internal thread portion 42b of the ball nut 42. Because the protrusions 73a to 73d abut against inner side faces of the respective holes 71a to 71d (each of the holes 71a to 71d has two inner side faces that are opposed to each other in the circumferential direction of the external thread portion 51a), rotation of the external thread member 51 relative to the ball nut 42 (the internal thread portion 42b) is restricted. Thus, the external thread member 51 is restrained from being loosened. Further, because the protrusions 73a to 73d abut respectively against inner side faces of the respective holes 71a to 71d (each of the holes 71a to 72d has two inner faces that are opposed to each other in the axial direction of the external thread portion 51a), the ball nut 42 is restrained from being displaced in the direction along the axis of the ball nut 42. Thus, even if the external thread member 51 is accidentally loosened, the external thread member 51 is restrained from coming off the ball nut 42.

The toothed pulley usually does not have a crown (a higher middle portion) unlike a flat pulley. Therefore, the belt may be slipped to one side in the axial direction of the pulley due to, for example, the parallelism of the axis, or characteristics inherent to the belt. Thus, in order to restrain the belt 33 from coming off the driven pulley 32, the following configuration is adopted in the present embodiment.

As illustrated in FIG. 4, a first flange 81 and a second flange 82 are provided on the opposite sides of the driven pulley 32 in the axial direction of the driven pulley 32. The first flange 81 is provided at an end portion of the driven pulley 32, the end portion being located on the opposite side of the driven pulley 32 from the flange 51b. The first flange 81 has an annular shape. The first flange 81 is fitted to a small-diameter portion (step portion) 32a that is formed in an end portion of the driven pulley 32, the end portion being located on the ball bearing 44 side. By swaging a portion of the small-diameter portion 32a, to which the first flange 81 is fitted, the first flange 81 is secured to the small-diameter portion 32a.

The second flange 82 also has an annular shape. The second flange 82 is formed on the flange 51b of the external thread member 51. In the state where the inner ring 44a and the driven pulley 32 are sandwiched between the two flanges 42a, 51b by fastening the external thread portion 51a of the external thread member 51 into the internal thread portion 42b of the ball nut 42, the second flange 82 fulfills the function of preventing the belt 33 from coming off the driven pulley 32, in cooperation with the first flange 81.

The action of the configuration for securing the ball bearing 44 and the driven pulley 32 will be described below. The ball bearing 44 and the driven pulley 32 are fitted on the outer peripheral face of the ball nut 42. By fastening the external thread portion 51a of the external thread member 51 to the internal thread portion 42b of the ball nut 42, the ball bearing 44 and the driven pulley 32 are secured to the ball nut 42 while being sandwiched between the two flanges 42a, 51b. That is, the ball bearing 44 and the driven pulley 32 are overlapped with the ball nut 42 on the outside of the ball nut 42, and the external thread portion 51a is overlapped with the ball nut 42 on the inside of the ball nut 42, in the axial direction of the rack shaft 13.

Figure 9:
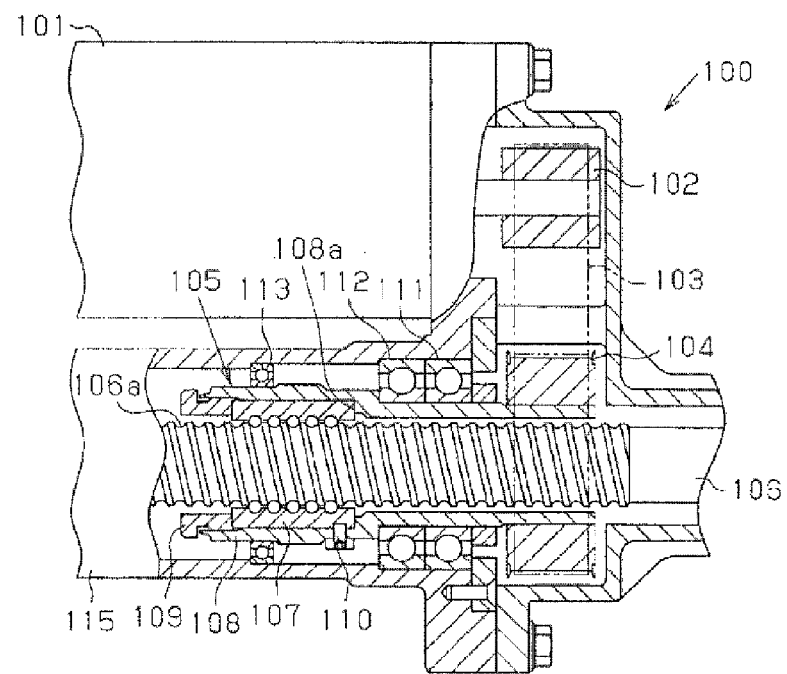
FIG. 9 is an enlarged sectional view illustrating main portions of a conventional electric power steering system.

Thus, the EPS 10 in the present embodiment is more compact in the axial direction of the rack shaft 13, than the conventional EPS 100 illustrated in FIG. 9, in which the driven pulley 104, the two bearings 111, 112, the bolt 110, the ball nut 107 and the external thread 109 are arranged in the axial direction of the rack shaft 106. This is because the ball bearing 44, the driven pulley 32 and the external thread portion 51a are disposed within a range of the ball nut 42. Further, a member that connects the ball nut 107 to driven pulley 104 located apart from the ball nut 107, such as the nut holder 108 as illustrated in FIG. 9, is no longer necessary. Accordingly, it is possible to simplify the configuration of the EPS.

The restricting member 73 that prevents the external thread member 51 from coming off the ball nut 42 is set inside the external thread portion 51a. Thus, the installation space is smaller than that when the restricting member 73 is disposed outside the ball nut 42. The restricting member 73 is formed by plastically deforming a metal wire into a C-shape. Thus, the restricting member 73 is easily deformed elastically in its radial direction. Thus, the restricting member 73 is easily set inside the external thread portion 51a.

The second flange 82 that restrains the belt 33 from coming off the driven pulley 32 is integrally formed with the flange 51b of the external thread member 51. Thus, the number of components is smaller than that in the case where the second flange 82 is formed independently from the external thread member 51, as in the case where the first flange 81 is formed independently from the driven pulley 32. Further, a work of attaching the second flange 82 to the driven pulley 32, like a work of attaching the first flange 81 to the driven pulley 32, is not necessary. Thus, the number of man-hours required for the assembly is reduced.

According to the present embodiment, the following advantageous effects are obtained. The ball bearing 44 and the driven pulley 32 are secured to the outer peripheral face of the ball nut 42 by the flange 42a of the ball nut 42 and the flange 51b of the external thread member 51 screwed into the internal thread portion 42b of the ball nut 42. Because the driven pulley 32, the ball bearing 44 and the external thread portion 51a are all overlapped with the ball nut 42 in its axial direction, it is possible to reduce the length of the power conversion mechanism 20 and thus the length of the EPS 10 in the axial direction of the rack shaft 13. Thus, the ease of mounting the EPS 10 in a vehicle is enhanced.

The second flange 82 that restrains the belt 33 from coming off the driven pulley 32 is integrally formed with the external thread member 51. Thus, the number of components is smaller than that in the case where the second flange 82 is formed independently from the external thread member 51. As a result, the number of man-hours required for the assembly is reduced.

The restricting member 73 that restrains the external thread member 51 from coming off the ball nut 42 is set inside the external thread portion 51a of the external thread member 51. Thus, it is possible to obtain the compact external thread member 51 with a coming-off preventing function.

The protrusions 73a to 73d of the restricting member 73 are passed through the holes 71a to 71d of the external thread member 51 from the inside of the external thread portion 51a, and are inserted into the groove 72 formed in the internal thread portion 42b of the ball nut 42. Because the protrusions 73a to 73d are engaged with the groove 72 in the axial direction of the rack shaft 13, the external thread member 51 is restrained from being displaced relative to the ball nut 42 in the axial direction of the ball nut 42. Thus, even if the external thread member 51 is loosened, the external thread member 51 does not come off the ball nut 42.

The restricting member 73 is formed by plastically deforming a metal wire into a C-shape. Thus, the restricting member 73 is easily deformed elastically in its radial direction. Thus, the restricting member 73 is easily attached to or detached from the external thread member 51.

Note that, the embodiment described above may be modified as follows. In the embodiment described above, the protrusions 73a to 73d of the restricting member 73 are passed through the holes 71a to 71d of the external thread portion 51a and then engaged with the groove 72 of the internal thread portion 42b, so that the external thread member 51 is restrained from coming off the driven pulley 32. Alternatively, the following configuration may be adopted.

Figure 6:
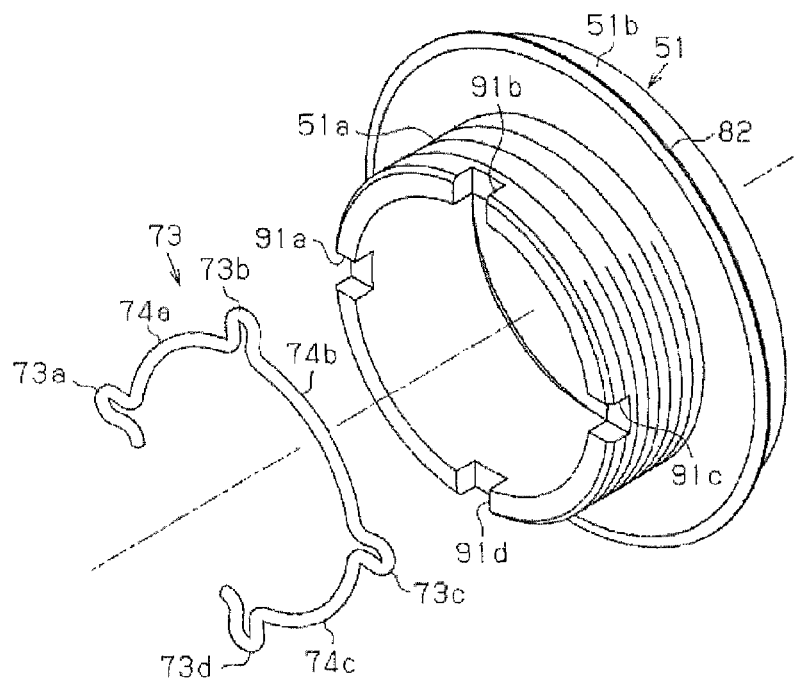
FIG. 6 is an exploded perspective view illustrating an external thread member and a restricting member in another embodiment of the invention.

As illustrated in FIG. 6, instead of the holes 71a to 71d, grooves 91a to 91d are formed in the external thread portion 51a. The grooves 91a to 91d, which are cutouts, are formed in the peripheral wall at the distal end of the external thread portion 51a, and are opened at the distal end face of the external thread portion 51a.

Figure 7:
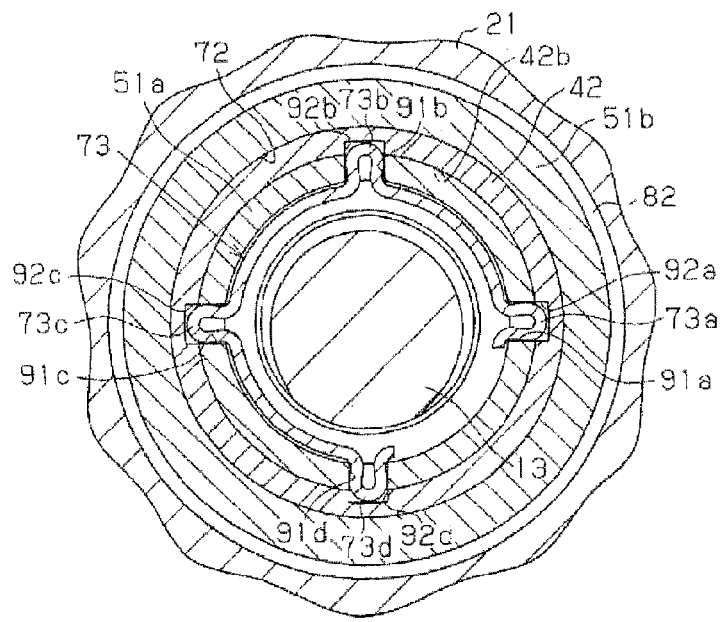
FIG. 7 is a sectional view taken along the line 5-5 in FIG. 2 in the other embodiment.

As illustrated in FIG. 7, instead of the annular groove 72, four recesses 92a to 92d are formed in the inner peripheral face of the internal thread portion 42b. Then, the external thread portion 51a is screwed into the internal thread portion 42b such that the ball bearing 44 and the driven pulley 32 are sandwiched between the two flanges 42a, 51b and the positions of the recesses 92a to 92d respectively coincide with the positions of the grooves 91a to 91d of the external thread portion 51a in both the radial and axial directions of the ball nut 42. In this state, the restricting member 73 is fitted to the external thread portion 51a from the inside of the external thread portion 51a. The protrusions 73a to 73d of the restricting member 73 are respectively inserted into the grooves 91a to 91d from the inside of the external thread portion 51a and are then engaged with the recesses 92a to 92d formed in the inner peripheral face of the internal thread portion 42b. With this configuration as well, the protrusions 73a to 73d are engaged respectively with the recesses 92a to 92d, so that the rotation of the external thread member 51 is restricted. Thus, it is possible to restrict loosening of the external thread member 51.

Figure 8:
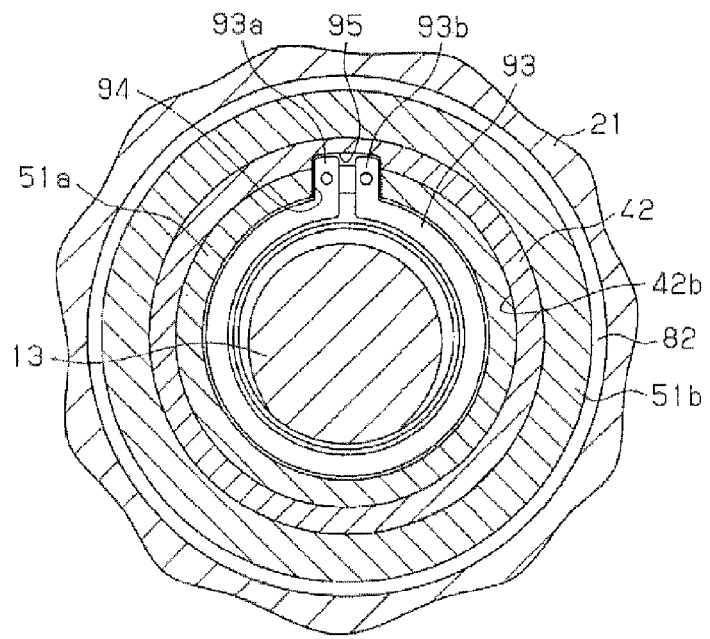
FIG. 8 is a sectional view taken along the line 5-5 in FIG. 2 in yet another embodiment of the invention.

In the embodiment described above, the restricting member 73 formed by plastically deforming a metal wire into a C-shape is used. However, a C-shaped snap ring 93 may be adopted, instead of the restricting member 73. As illustrated in FIG. 8, two protrusions 93a, 93b that extend radially outward are formed at the opposite end portions of the C-shaped snap ring 93. A single hole 94 through which the two protrusions 93a, 93b are passed is formed in the external thread portion 51a, and a single groove 95 in which the two protrusions 93a, 93b are inserted is formed in the inner peripheral face of the internal thread portion 42b. With this configuration as well, the two protrusions 93a, 93b are passed through the hole 94 and engaged with the groove 95, so that both the rotation and axial displacement of the external thread member 51 is restricted. A general-purpose product may be used as the C-shaped snap ring 93.

In the embodiment described above, a toothed drive pulley, a toothed driven pulley and a toothed belt are used respectively as the drive pulley 31, the driven pulley 32 and the belt 33. Alternatively, a flat belt and flat pulleys that have no teeth may be used respectively as the belt 33, and the drive pulley 31 and the driven pulley 32.

Instead of the belt transmission mechanism 30, a chain transmission mechanism may be used. In this case, the drive pulley 31, the driven pulley 32 and the belt 33 are replaced respectively with a drive sprocket, a driven sprocket and a roller chain. The driven sprocket is held, together with the ball bearing 44, between the two flanges 42a, 51b to be secured to the ball nut 42. Note that, the external thread member 51 need not be provided with the flange 51b.

A gear transmission mechanism may be used instead of the belt transmission mechanism 30. In this case, for example, the drive pulley 31 and the driven pulley 32 are replaced respectively with a drive spur gear and a driven spur gear, and the drive spur gear and the driven spur gear are meshed with each other. The driven spur gear is held, together with the ball bearing 44, between the two flanges 42a, 51b to be secured to the ball nut 42. Note that, external thread member 51 need not be provided with the flange 51b.

In the embodiment described above, the ball nut 42 is supported by the inner peripheral face of the housing 11 via the ball bearing 44, which is a kind of rolling bearings, so as to be rotatable relative to the inner peripheral face of the housing 11. However, other kinds of rolling bearings, such as a roller bearing, may be used instead of the ball bearing 44.

In the embodiment described above, the external thread member 51 is fastened to the internal thread portion 42b of the ball nut 42 in order to secure the ball bearing 44 and the driven pulley 32 to the ball nut 42. Alternatively, the following methods of securing the ball bearing 44 and the driven pulley 32 to the nut 42 may be adopted instead of screw-tightening. The ball bearing 44 and the driven pulley 32 may be secured to the ball nut 42 by bonding, press-fitting, spline-connection (fitting), or the like. That is, the method of securing the ball bearing 44 and the driven pulley 32 to the ball nut 42 is not particularly limited, as long as the ball bearing 44 and the driven pulley 32 are held by the two flanges 42a, 51b. When the ball bearing 44 and the driven pulley 32 are secured to the ball nut 42 by bonding or press-fitting, neither thread ridges nor thread grooves need to be formed on the outer peripheral face of the external thread portion 41 and the inner peripheral face of the internal thread portion 42b. When the ball bearing 44 and the driven pulley 32 are secured to the ball nut 42 by spline-fitting, the relative rotation between the ball nut 42 and the driven pulley 32 is appropriately restricted.

The invention may be applied to a so-called rack-cross-type electric power steering in which the axis of a motor extends in a direction that crosses the axis of a rack shaft. In the embodiment described above, the invention is applied to the electric power steering system 10 in which the operation of the rack shaft 13 that makes a linear motion in response to a driver's steering operation is assisted with the use of torque generated by the motor 18. However, the invention may be applied to a steer-by-wire (SBW) steering system. The steer-by-wire steering system does not have a mechanical connection between a steering wheel and steered wheels, and a driver's operation of the steering wheel is transmitted, in the form of electronic signals, to a steering actuator. The steering actuator includes a motor, and for example, the belt transmission mechanism 30 and the ball screw mechanism 40, as the power conversion mechanism 20 that converts the rotary motion generated by the motor into a linear motion of steered shaft (ball screw shaft).

When the invention is applied to the steer-by-wire steering system, the steering system according to the invention may be adopted not only as a front wheel steering system, but also as a rear wheel steering system or a four wheel steering system (4WS).

What is claimed is:

1. A steering system comprising:
a steered shaft that makes a linear motion in a housing to steer steered wheels;
a driving wheel that is disposed in the housing, and that rotates about an axis extending parallel to an axis of the steered shaft in response to driving of a motor;
a ball nut screwed to the steered shaft via multiple balls, and supported via a bearing by an inner peripheral face of the housing so as to be rotatable relative to the inner peripheral face of the housing, the ball nut having a first end portion and a second end portion, a first flange being formed on an outer peripheral face of the first end portion and an inner-diameter-increased portion being formed in an inner peripheral face of the second end portion;
a driven wheel fitted on an outer periphery of the ball nut to transmit rotation of the driving wheel to the ball nut;
a hollow connection member including a connection portion inserted in and connected to the inner-diameter-increased portion, and a second flange; and
a restricting member disposed along an inner peripheral face of the connection member, wherein
the bearing and the driven wheel are held between the second flange and the first flange in an axial direction of the steered shaft when the connection portion is connected to the inner-diameter-increased portion, and
the restricting member has at lease one protrusion passed through the connection portion and engaged with a groove formed in an inner peripheral face of the inner-diameter-increased portion, in the axial direction.

2. The steering system according to claim 1, wherein:
the connection portion is an external thread portion, and the inner-diameter-increased portion is an internal thread portion; and
when the external thread portion is screwed into the internal thread portion, the ball nut and the connection member are connected to each other and the bearing and the driven wheel are held between the first flange and the second flange in the axial direction.

3. The steering system according to claim 1, wherein:
the driving wheel is a drive pulley, and the driven wheel is a driven pulley to which rotation of the driving wheel is transmitted through an endless belt looped over the drive pulley and the driven pulley;
two flanges that restrain the belt from coming off the driven pulley are respectively provided on opposite sides of the driven pulley in the axial direction; and
one of the flanges is formed on the second flange.

4. The steering system according to claim 1, wherein:
the motor is secured to an outer side of the housing; and
the motor has an axis extending parallel to the axis of the steered shaft.

* * * * *